United States Patent
Srinivasan et al.

(10) Patent No.: US 11,048,387 B1
(45) Date of Patent: Jun. 29, 2021

(54) SYSTEMS AND METHODS FOR MANAGING MEDIA FEED TIMELINES

(71) Applicant: Rovi Guides, Inc., San Jose, CA (US)

(72) Inventors: Madhusudhan Srinivasan, Karthiknagar (IN); Deviprasad Punja, Bangalore (IN); Siddhartha Pande, Bengaluru (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 16/807,039

(22) Filed: Mar. 2, 2020

(51) Int. Cl.
*G06F 3/0482* (2013.01)

(52) U.S. Cl.
CPC .................. *G06F 3/0482* (2013.01)

(58) Field of Classification Search
CPC ........ H04L 51/32; H04L 51/67; G06F 3/0482
See application file for complete search history.

(56) References Cited

U.S. PATENT DOCUMENTS

| | | | |
|---|---|---|---|
| 8,930,819 B1* | 1/2015 | Chan | H04L 67/02 715/736 |
| 8,996,625 B1* | 3/2015 | Singleton | H04L 29/06 709/206 |
| 2010/0083124 A1* | 4/2010 | Druzgalski | G06F 16/9537 715/738 |
| 2010/0205169 A1* | 8/2010 | Narayan | G06F 16/958 707/711 |
| 2011/0021250 A1* | 1/2011 | Ickman | G06F 3/0482 455/566 |
| 2011/0154223 A1* | 6/2011 | Whitnah | G06Q 10/10 715/753 |
| 2014/0173666 A1* | 6/2014 | Gordon | H04N 21/2543 725/51 |
| 2015/0234887 A1* | 8/2015 | Greene | G06Q 50/01 707/736 |
| 2015/0358303 A1* | 12/2015 | Hui | G06F 16/248 726/4 |
| 2016/0182423 A1* | 6/2016 | Tevosyan | G06F 3/0482 715/752 |
| 2017/0169125 A1* | 6/2017 | Greco | G06F 3/0485 |
| 2017/0302610 A1* | 10/2017 | Naidu | H04L 51/16 |
| 2017/0359290 A1* | 12/2017 | Hsu | H04L 51/16 |
| 2018/0324126 A1* | 11/2018 | Grant | H04L 51/12 |
| 2019/0332688 A1* | 10/2019 | Valentine | G06F 16/955 |

OTHER PUBLICATIONS

U.S. Appl. No. 16/807,038, filed Mar. 2, 2020, Madhusudhan Srinivasan.

* cited by examiner

*Primary Examiner* — Dino Kujundzic
(74) *Attorney, Agent, or Firm* — Haley Guiliano LLP

(57) ABSTRACT

The system manages aggregating posts to a media feed to provide timeline updates. The system identifies a composite post of the media feed that corresponds to a first post and a second post. The composite post includes a content item and composite information. The system identifies at least one trigger to interact with the composite post. The trigger may be provided by a user or from the system itself. The system determines an action based on the at least one trigger and based on one or more composite criteria. The composite criteria may include rules or norms for managing interactions. The system generates modified composite information based on the action and the composite information. The system also generates a modified media feed for output. For example, the system may display a modified media feed with information regarding the first post and the second post.

18 Claims, 11 Drawing Sheets

SYSTEMS AND METHODS FOR MANAGING MEDIA FEED TIMELINES

BACKGROUND

The present disclosure relates to devices managing a media feed, and, more particularly, devices that manage related media content in a media feed.

SUMMARY

Timeline updates are based on or otherwise linked to a personality. Typically, a system that updates the timeline does not consider merging updates when personalities meet, content is shared, or other multiple updates are otherwise linked. For example, a political leader may meet other personalities such as business leaders, friends, or celebrities at conferences or other events.

The present disclosure describes systems and methods for determining s grouping of personalities and how updates to a timeline regarding the personalities can be aggregated to provide more meaningful timeline updates for each user. Updates that would normally appear at different places in the timeline (e.g., posted at different times) thus appear together (e.g., combined in some suitable way). The system manages posts on a displayed media feed. To illustrate, a first post includes a first content item, such as an image or a video, for example, and first information related to the content. The system identifies a second post either when uploaded or posted, for example, the second post including a second content item and information related to the second content item. The system determines of the first and second content items are the same by determining that the content share one or more depicted objects, have the same source, have the same filename or identifier, have the same creator, or a combination thereof. If the content items are duplicative, the system generates a combined post, which can include either or both individual posts and any suitable information relating to either or both individual posts.

In some embodiments, once a combined post is generated, one or more users may "like," comment on, share, or otherwise interact with the post. The system identifies the composite post as corresponding to a first post and a second post. Upon receiving an indication that triggers the system, the system determines an action to perform based on the at least one trigger and based on one or more composite criteria. The composite criteria can specify, for example, how to apply likes, comments, shares, and other interactions, how to display this information, and how to store this information in memory storage. The system, in response to the trigger, generates modified composite information based on the action and the interaction. The system also generates output that includes the modified media feed that includes information indicative of the interaction.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

The present disclosure is, in some embodiments, directed to methods and systems for managing a media feed, and more particularly for combining duplicative posts and allowing interactions with combined posts.

Figure 1:
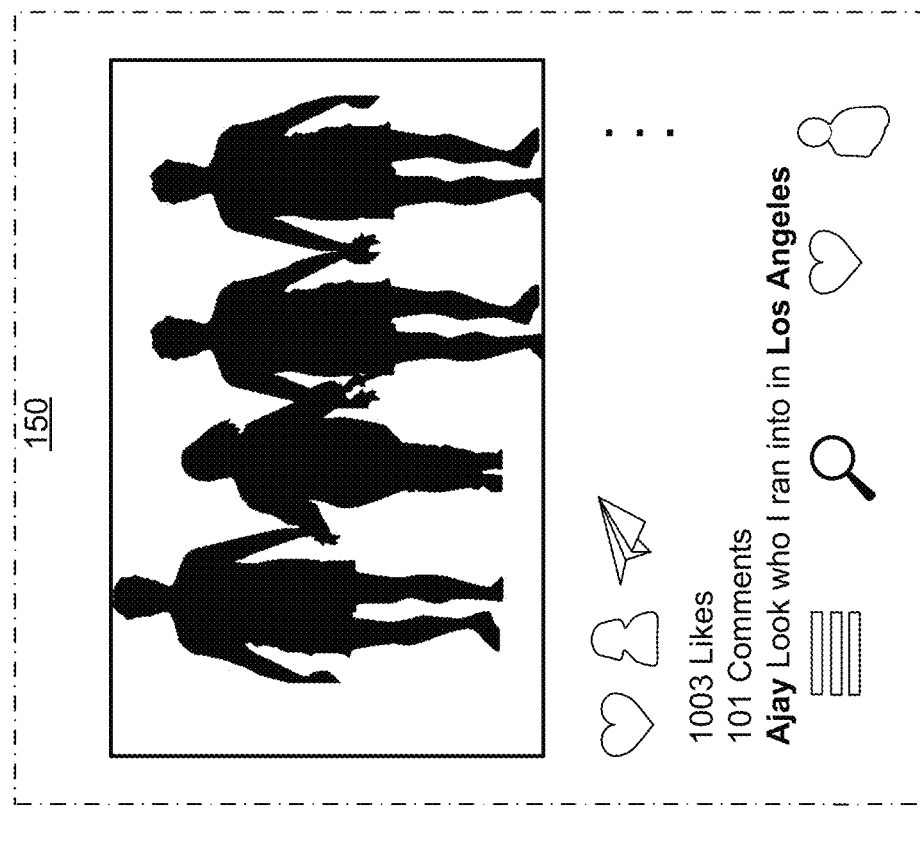
FIG. 1 shows an illustrative screen including two posts that may be combined, in accordance with some embodiments of the present disclosure.
Figure 1:
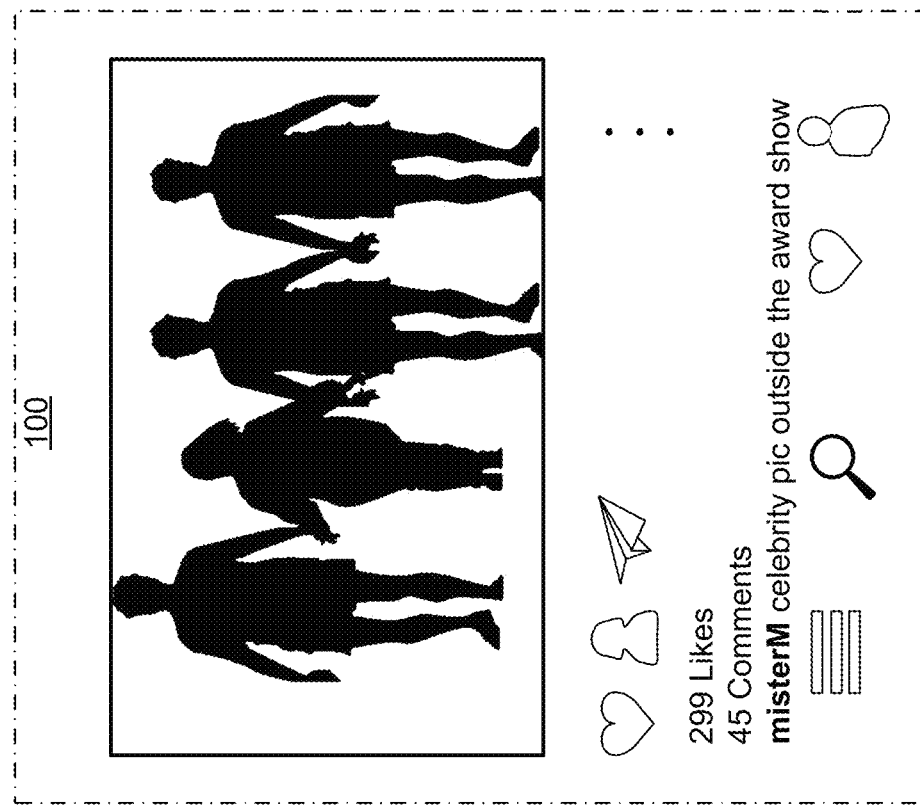

FIG. 1 shows an illustrative screen including two posts, post 100 and post 150, that may be combined, in accordance with some embodiments of the present disclosure. Posts 100 and 150 both include the same photograph of a group of celebrities that has been shared, and are included in a timeline associated with a user of the social media platform.

In regard to social media platforms, users may follow celebrities and persons of importance based on their interests. Activities from these persons may include posts to a social media feed associated with one or more platforms, and the posts may be displayed in a timeline associated with the user. For example, the user may follow several celebrities linked to a particular genre of music (e.g., the four people depicted in posts 100 and 150). The celebrities may convene for a concert or other event, and may take a group selfie picture. Each celebrity may post the same picture to update their status on a social media platform (e.g., a first celebrity generates post 100 and a second celebrity generates post 150). If both posts were to be included in a user's timeline, the platform may provide a single timeline entry that includes the picture and related updates from following the personalities depicted in the picture. Accordingly, the content of the picture is preserved and associated information for the individual posts may be included in a single post.

Figure 2:
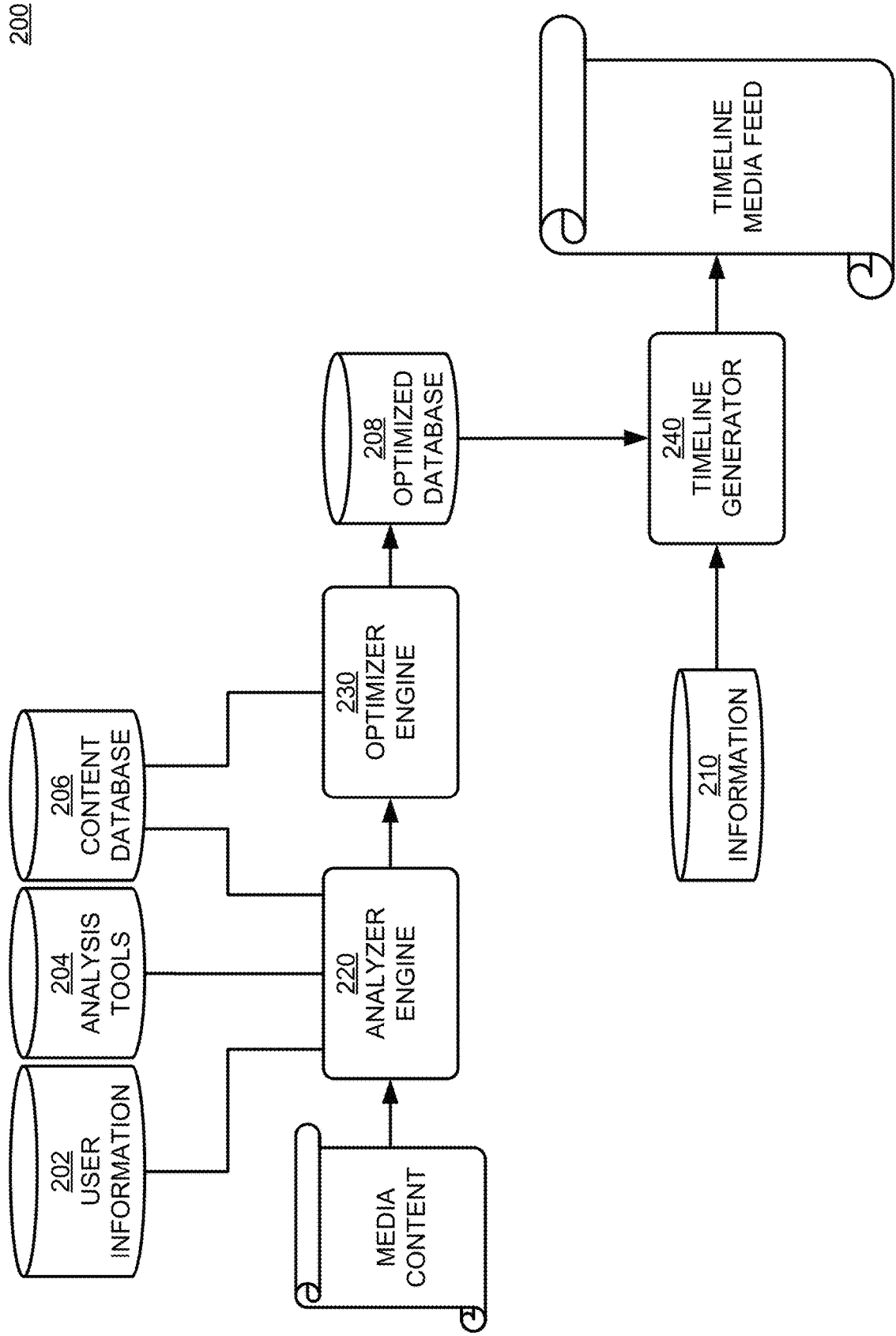
FIG. 2 is a block diagram of an illustrative system for managing media content in a media feed, in accordance with some embodiments of the present disclosure.

FIG. 2 is a block diagram of illustrative system 200 for managing media content in a media feed, in accordance with some embodiments of the present disclosure. System 200, as illustrated, includes analyzer engine 220, optimizer engine 230, timeline generator 240, user information 202, analysis tools 204, content database 206, information 210, and optimized database 208. System 200 may be implemented in software, hardware, or both, and may include, for example, an application (e.g., a social media platform), computing equipment (e.g., a server, user device, or computer, having control circuitry), information stored in suitable memory storage devices. System 200 may be implemented on a single computing device or may be implemented using more than one computing device. For example, analyzer engine 220, optimizer engine 230, and timeline generator 240 may be, but need not be, implemented on a single device.

In an illustrative example, system 200 monitors all content (e.g., pictures and videos) that include people together, using object recognition techniques to identify the entities depicted in the content. The identified entities may be stored as metadata associated with the content, the user, or the platform. System 200 may search for or otherwise determine location information (e.g., from a metadata tag, an exif tag, comments from a user), background objects in the content, and any other suitable information and store this information in memory storage. As new pictures are uploaded and/or posted, system 200 may search an internal database for possible duplicative content. If system 200 determines that a set of images can be unified (e.g., combined), then system 200 may combine the comments of each post. For example, the comments may be classified and presented per poster of the image in a sequence rather than as a series of individual posts. In an illustrative example, a photograph may include five celebrities, and a user might follow only two out of the five. System 200 may then only show the comments for the two celebs with a recommendation that there are comments from other celebrities that the user does not follow but would be of interest in the context of the content the user is consuming (e.g., after the user opts in, such comments would also be shown).

Analyzer engine 220 is configured to analyze a potential, imminent, or existing content item associated with a timeline post. In some embodiments, analyzer engine 220 is triggered each time a media content item is uploaded. Analyzer engine 220 may use object identification, image recognition, natural language processing (NLP), any other suitable technique, or any combination thereof to analyze posts, associated media content items, or both. For example, analyzer engine 220 may identify individuals (e.g., using facial recognition, based on metadata tags), locations (e.g., based on metadata tags, identified landmarks or features), background objects (e.g., recognizable objects that provide some context information or a reference for comparison), source (e.g., a device name, a software or hardware address, a username), any other suitable features, or any combination thereof. In an illustrative example, analyzer engine 220 may use object and image recognition techniques to identify features of content, and then test analyses using NLP to identify and tag individuals, location (from content metadata & comment analysis), background objects, and any other suitable features. In some embodiments, analyzer engine 220 stores analysis information in content database 206 and notifies optimizer engine 230.

Analyzer engine 220 may classify content that is being shared, posted, or uploaded by identifying objects, text that is included in or accompanying content, or other criteria, such as genre, location, popularity, any other suitable criteria, or any combination thereof. Analysis tools 204 may include an object identifier configured to perform object recognition techniques on images and videos to identify people, places, things, events, any other suitable objects, or any combination thereof depicted in a content item. Analysis tools 204 may include an NLP classifier for analyzing text that is included in a content item (e.g., excerpts from an article, text in an image), text that is included in metadata associate with the content item (e.g., metadata tags or identifiers), text that accompanies the content item (e.g., a caption, note or message), any other suitable text associated with a content item, or any combination thereof. Analysis tools 204 may include one or more classifiers configured to identify and analyze geographic information (e.g., a GPS tag or other location tag), genre information, storage information (e.g., in which database content is stored, which service provides/hosts the content, and formatting information), usage information (e.g., popularity, number of views, number of shares), content attributes (e.g., visual attributes, image quality, video quality, content datafile size), any other suitable information associated with the content, or any combination thereof.

In an illustrative example, each time a content item is shared, analyzer engine 220 analyzes the content item. In some embodiments, analyzer engine 220 analyzes the content item based on reference information (e.g., classification constructs and any other suitable means of classifying content) stored in analysis tools 204. For example, reference information may include templates or other references against which content is compared. In a further example, reference information may include keywords or tags that are compared with metadata associated with the content item. In an illustrative example, analyzer engine 220 may identify a video clip of a movie premiere, and metadata associated with the video may include one or more tags identifying entities (e.g., actors, directors, or journalists in this example, along with a location of a theatre) shown or mentioned in the video. In some embodiments, content database 206 includes an information graph or knowledge graph, storing information about entities, subject-matters, location, attributes, any other suitable information, or any combination thereof.

Analyzer engine 220 may be implemented on any suitable hardware, which may be the same as or different from hardware or devices in which optimizer engine 230 is implemented. User information 202, analysis tools 204, and content database 206 may be configured to store information in any suitable format, arranged in any suitable arrangement, in accordance with the present disclosure. In some embodiments, content database 206, analysis tools 204, and user information 202 may be stored as a single database, or implemented on one or more devices. In some embodiments, content database 206, analysis tools 204, and user information 202 are stored separately from each other on the same hardware or different hardware.

User information 202 may include user identification information (e.g., name, an identifier, address, contact information), user search history (e.g., previous voice queries, previous text queries, previous search results, feedback on previous search results or queries), user viewing or consumption history, user preferences (e.g., search settings, favorite entities, keywords included in more than one query), user likes/dislikes (e.g., entities followed by a user in a social media application, user-inputted information), other users connected to the user (e.g., friends, family members, contacts in a social networking application, contacts stored in a user device), keywords provided by the user or generated based on the user, any other suitable information about a user, or any combination thereof.

Analysis tools 204 are configured to store, host, provide, or otherwise facilitate application tools for analyzing media content items or features thereof. Analysis tools 204 may include applications, reference information (e.g., templates, objects, libraries thereof, or a combination thereof), modules, components thereof, or any combination thereof. For example, in some embodiments, analysis tools 204 include object recognition tools configured to take as input a media content item, and provide as output one or more identified objects (e.g., tags associated with entities, objects, locations, events, users, or other suitable tags). In some embodiments, analysis tools 204 is included in analyzer engine 220. Analysis tools 204 may be implemented in the same or different software and software such as analyzer engine 220.

Content database 206 is configured to store content data, metadata, information associated with content, any other suitable information, or any combination thereof. Content may include linear programming media assets, on-demand assets, images, videos, text, any other suitable media, or any combination thereof. Content data, metadata, or both may be indexed, stored as a database, catalogued, or otherwise organized in any suitable arrangement. Accordingly, content data, metadata, or both may be recalled or otherwise retrieved using any suitable reference, index, or otherwise identification. In an illustrative example, content database 206 may include metadata linked to content data for a plurality of media content items.

Content database 206 may include content information such as, for example, a location including a user-defined location (e.g., as input by the user to a touchscreen), GPS data (e.g., coordinates or locations based on GPS data), map data, and an entity identifier (e.g., a site name, such as "Citi Field"). In some embodiments, location information includes a keyword tag inputted by a user (e.g., "Phoenix," "Mexico," "Yosemite National Park"). In some embodiments, location information includes a GPS tag including raw data, from each of a plurality of satellites, such as a satellite clock value, ephemeris values, and almanac values. In some embodiments, location information includes a GPS tag including time, longitude, latitude, altitude, and number of satellites the data is based on. In some embodiments, location information includes a device-generated tag based on GPS data. For example, a location may include a street name, intersection identifier, neighborhood name, city name, state name, country name, park name, body of water name, geological feature name (e.g., Grand Canyon, Mojave Desert), geological feature description (e.g., mountain, forest, creekside), any other suitable tag corresponding to a location, or any combination thereof. Tags, as stored in content database 206, include attributes, entities, privacy settings, restriction settings, descriptions, user preferences, compatibilities, and keywords. Attributes may include, for example, people, places, events, items, arrangements thereof, any other suitable aspect depicted in content, or any combination thereof. For example, an attribute may include a particular person, a person identifier (e.g., adult, woman, boy, baby), a binary indication of whether any person is depicted in the content, any other suitable person-related information, or any combination thereof. In a further example, attributes may include an event name (e.g., "Easter," "Trip to NYC"), an item identifier (e.g., a car, a boat, a building, a beverage, a computer, a user device, a television), an arrangement of items (e.g., a set dinner table, a group of people, a car race, a cityscape), any other suitable descriptors for aspects depicted in content, or any combination thereof. In some embodiments, content database 206 includes owner input, file history, modifications, posted comments, file properties, and image quality. In some embodiments, content database 206 includes input from a user or content owner (e.g., descriptions, preferences, or status identifiers), a file transaction history (e.g., receiving, transmitting, storing, recalling, modifying), content modifications (e.g., a mapping of changed pixels in a rasterized image), a history of users' interaction with content items (e.g., comments, views, user tags such as "likes"), properties of the content data file or metadata file (e.g., file size, file location, file compression), a quality metric of the content item (e.g., a resolution in units of pixels; a color scale, such as color/grayscale/black-and-white; quality identifier such as good, bad, or blurry), any other suitable information, or any combination thereof.

Optimizer engine 230 is configured to determine links or relationships among content items. In some embodiments, optimizer engine 230 searches for related group-media content for which a group may have interacted (e.g., commented on). For example, optimizer engine 230 may be configured to filter content where group activity is likely to be involved and may use metadata stored in content database 206 for this purpose. If optimizer engine 230 determines that a set of uploaded content is similar in terms of objects, depicted entities, locations, sources (e.g., device with which content is created), any other suitable features, or any combination thereof. Accordingly, optimizer engine 230 determines whether features match based on a match threshold of at least a given percentage (e.g., 80% or any other suitable threshold), and then identifies such content as a candidate for a unified view in a timeline. Content that has been considered for matching, metadata associated with the content, or both, are stored in optimized database 208.

In some embodiments, optimized database 208 may be similar to, or included as part of, content database 206. For example, in some embodiments, content database 206 and optimized database 208 are a single database, wherein metadata includes tags generated by optimizer engine 230 that provide links among related, or potentially related, content. Optimized database 208 may be configured to store information in any suitable format.

Timeline generator 240 is configured to identify content that is uploaded, shared, posted, or otherwise referenced in a timeline as being related to other content that has been uploaded, shared, posted, or otherwise referenced in the timeline. In some embodiments, timeline generator 240 uses information from optimized database 208 to group related content and its comments into a composite post. In some embodiments, timeline generator 240 generates recommendations from comments provided by entities depicted in the content and whom the user is not following. In some embodiments, timeline generator 240 continues to use existing sources of information (e.g., from information 210) to generate the timeline information and then use information from optimized database 208 to group and substitute content that may be duplicative or otherwise related to other content.

Information 210 includes information such as platform features (e.g., logos, icons, fonts, arrangements, text, images, or other features), content, metadata, display criteria, user information (e.g., similar to or the same as user information 202), any other suitable information, or any combination thereof. Timeline generator 240 retrieves, accesses, or otherwise uses information from information 210 to generate a timeline having a media feed. In an illustrative example, timeline generator 240 may be associated with a particular social media platform, and information 210 may include the display template for timelines of that platform. In some embodiments, information 210, timeline generator 240, and optimized database 208 may be included in the same application, implemented using the same control circuitry.

Figure 3:
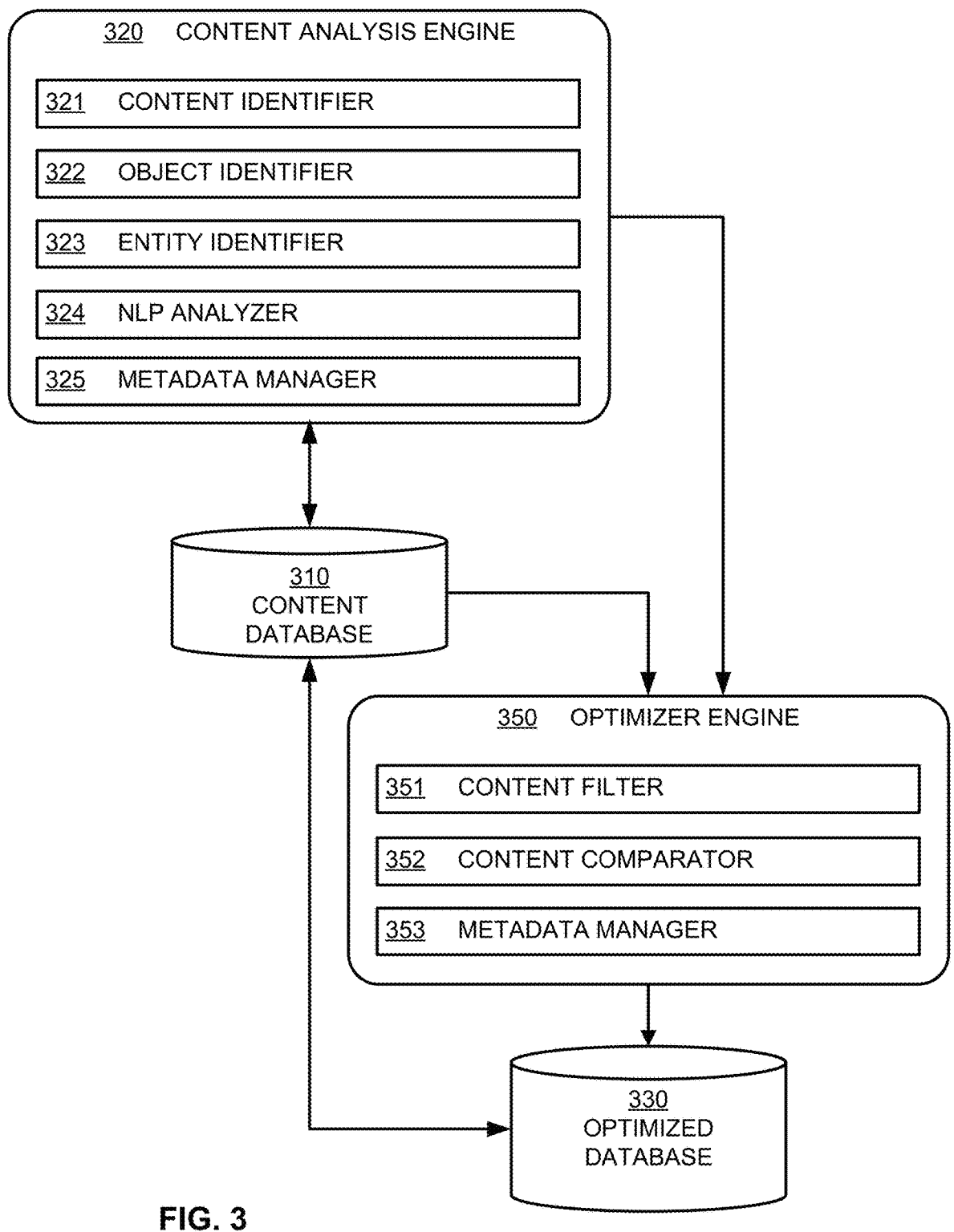
FIG. 3 is a block diagram of an illustrative system for analyzing media content, in accordance with some embodiments of the present disclosure.

FIG. 3 is a block diagram of illustrative system 300 for analyzing media content, in accordance with some embodiments of the present disclosure. System 300, as illustrated, includes content analysis engine 320, optimizer engine 350, content database 310, and optimized database 330. In some embodiments, content analysis engine 320 may be similar to analyzer engine 220 of FIG. 2. In some embodiments, optimizer engine 350 may be similar to optimizer engine 230 of FIG. 2. System 300 may be implemented in software, hardware, or both, and may include, for example, an application (e.g., a social media platform), computing equipment (e.g., a server, user device, or computer, having control circuitry), information stored in suitable memory storage devices. System 300 may be implemented on a single computing device or may be implemented using more than one computing device. For example, content analysis engine 320 and optimizer engine 350 may be, but need not be, implemented on a single device.

As illustrated, content analysis engine 320 includes content identifier 321, object identifier 322, entity identifier 323, NLP analyzer 324, and metadata manager 325. In some embodiments, content analysis engine 320 may be the same as similar to analyzer engine 220 of FIG. 2. Content analyzer engine 320 is configured to identify features of content, information about content, or both, that may be used to determine whether the content is the same as, or otherwise related to, other content.

Content identifier 321 is configured to identify a content item at the time it is created, stored, uploaded, accessed, displayed, retrieved, at any other suitable time, or any combination thereof. For example, content identifier 321 may identify the content item while generating a timeline that includes or references the content item. In a further example, content identifier 321 may identify the content item when it is uploaded or otherwise stored for subsequent access. In some embodiments, content identifier 321 identifies the content item based on input received at an input interface. For example, a user may use a handheld remote or other interface device to input a command to a user interface, selecting or highlighting the content item. In some embodiments, content identifier 321 identifies the content item among a plurality of content items. For example, content identifier 321 may identify one or more content items to generate a list or array of representations of the content items in a timeline having a media feed. Content identifier 321 may identify the content item, metadata associated with the content item, title information of the content item, a reference to the content item, or a combination thereof.

Object identifier 322 is configured to objects in content items identified by content identifier 321. Object identifier 322 may identify places, things, or features of a content item to characterize what is depicted in the content item. To illustrate, object identifier 322 may identify an area of an image using edge detection, pattern recognition, or any other suitable technique to identify and characterize features of a content item. For example, object identifier 322 may identify the Eiffel Tower in an image based on identifying the characteristic outline of the Eiffel Tower using edge detection. In some embodiments, object identifier 322 may compare identified features to reference templates or other reference features to determine whether a match exists. For example, object identifier 322 may access reference information that includes a plurality of templates, and then may apply the templates to the content item to determine whether any pre-defined objects exist.

Entity identifier 323 is configured to identify entities depicted in, referenced in, or otherwise associated with, content or metadata thereof. In some embodiments, content database 310 includes a structured collection of information corresponding to relationships among entities from which entity identifier 323 may retrieve entity information. Entities may include, for example, users, persons, devices (e.g., user devices, network devices), locations corresponding to users, locations corresponding to devices, network entities, addresses (e.g., location-based or network-based), accounts (e.g., social media accounts, messaging services accounts), any other suitable entity that corresponds to a message sender or receiver, or any combination thereof. Relationships may include, for example, a context of interaction between entities (e.g., person to person), a category associated with a contact in a contact list, communication relationship (e.g., devices on a particular network, devices hosting a particular application), a linkage in an application (e.g., entities linked in a social network or messaging application), any other suitable relationship type, or any combination thereof. For example, a relationship identifier may include a relationship between two devices (e.g., identified by a hardware address, an IP address, device name, or other suitable identifier) that may correspond to uploaders and consumers of posts to timelines. In some embodiments, entity identifier 323 identifies an entity associated with the content item by identifying a geographic location associated with content item, and then identifying the entity based on the geographic location. For example, a post may include a content item that includes a message having text, a GPS location tag, and a link to a video. Content analysis engine 320 may identify the GPS location tag, generate a text query or other retrieval request for content database 310, and identify an entity associated with the GPS location tag (e.g., an entity having an associated metadata tag that corresponds to the GPS location tag). For example, a user entity may share a photograph with another user, with a caption and a location marker included in metadata associated with the photograph. Content analysis engine 320 may analyze the metadata to identify the location marker, and identify the caption as being the same as or related to another content item based on the location (e.g., a name or other identifier of the location). To illustrate, metadata associated with a photograph may include a location tag that coincides with a location tag of another photograph of entity "Jim Charles."

Metadata manager 325 updates metadata of content database 310, optimized database 330, or both, adds tags to metadata, generates metadata, or both, thus updating and storing metadata corresponding to a content item identified by content identifier 321. For example, in some embodiments, object identifier 322 generates a flag and transmits the flag to metadata manager 325, which updates the existing metadata of information 210 based on the flag. In some embodiments, metadata manager 325 reads and writes files to memory (e.g., local memory storage or remote storage via a communications network). For example, in some embodiments, metadata manager 325 opens a content data file and metadata and provides that information to modules of content analysis engine 320. In a further example, content analysis engine 320 may generate tags or other changes to metadata, which may be provided to metadata manager 325, which in turn writes this information to an appropriate file and saves the file in suitable storage.

As illustrated, optimizer engine 350 includes content filter 351, content comparator 352, and metadata manager 353.

Content filter 351 determines whether content is appropriate or amenable to optimization by storage in optimized database 330. In some embodiments, content filter may determine a type of a content item such as, for example, an image, a video, a meme, text, audio/sound, or a combination thereof. In some embodiments, content filter 351 may determine an age based on creation date, upload date, or posting date, and filter out content that is older than a predetermined cut-off date to limit consideration to more recent content. In some embodiments, content filter 351 analyzes metadata associated with the content item to determine features or aspects of the content. For example, content filter 351 may identify metadata tags, properties of the content (e.g., file size/name/type, visual attributes), storage location, or other properties.

Content comparator 352 compares identified features of content with identified features of a plurality of other content to determine whether the content is duplicative. In some embodiments, content comparator 352 compares entities identified by entity identifier 323, objects identified by object identifier 322, text identified or determined by NLP analyzer 324, or other attributes. Content comparator 352 may determine that contents are a match if at least a predetermined number of attributes match, if particular attributes match, or based on any other suitable criteria.

Metadata manager 353 updates metadata of content database 310, optimized database 330, or both; adds tags to metadata of content database 310, optimized database 330, or both; generates metadata of content database 310, optimized database 330, or both; or otherwise manages updating and storing of metadata corresponding to a content item identified by content identifier 321. Metadata manager 353 may be, but need not be, different from metadata manager 325. In some embodiments, content comparator 352 generates a link and transmits the link to metadata manager 353, which updates the existing metadata of optimized database 330 based on the link. In some embodiments, metadata manager 353 reads and writes files to memory (e.g., local memory storage or remote storage via a communications network). For example, in some embodiments, metadata manager 353 opens a content data file and metadata and provides that information to content filter 351 or content comparator 352. In a further example, content comparator 352 may generate tags or other changes to metadata, which may be provided to metadata manager 353, which in turn writes this information to an appropriate file and saves the file in suitable storage.

In some embodiments, optimized database 330 may be similar to, or included as part of, content database 310. Optimized database 330 may be configured to store information in any suitable format.

Figure 4:
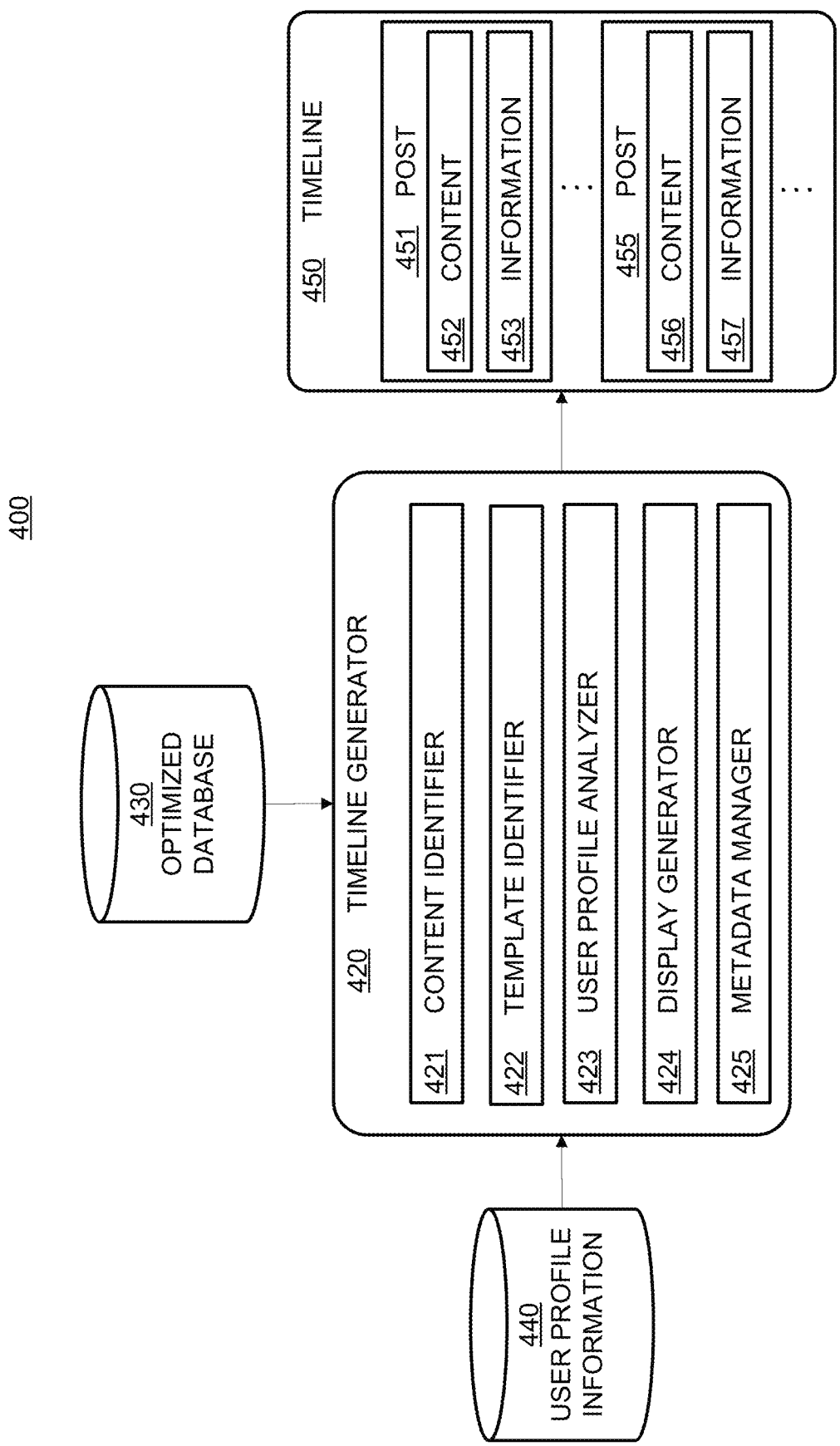
FIG. 4 is a block diagram of an illustrative system for managing a timeline, in accordance with some embodiments of the present disclosure.

FIG. 4 is a block diagram of illustrative system 400 for managing a timeline, in accordance with some embodiments of the present disclosure. As illustrated, timeline generator 420 includes content identifier 421, template identifier 422, user profile analyzer 423, display generator 424, and metadata manager 425. Timeline generator 420 is configured to generate, maintain, and modify timeline 450, as illustrated, that is generated for a user. Timeline 450 includes a plurality of posts (e.g., of which post 451 and 455 are two), which may each include content, text, comments, likes, dislikes, sharing information, any other suitable information, or any combination thereof. As illustrated, post 451 includes content 452 and information 453, and post 455 includes content 456 and information 457. Timeline generator 420 may be, but need not be, the same as or similar to timeline generator 240 of FIG. 2.

Content identifier 421 is configured to identify a content item at the time it is uploaded or posted. For example, content identifier 421 may identify the content item in a post that is shared while updating the timeline. In some embodiments, content identifier 421 identifies the content item based on input received at an input interface. For example, a user may use a handheld remote or other interface device to input a command to a user interface, selecting or highlighting the content item for uploading, sharing, or posting. In some embodiments, content identifier 421 identifies the content item among a plurality of content items. For example, content identifier 421 may identify one or more content items of an existing timeline to determine if any are duplicative. Content identifier 421 may identify the content item, metadata associated with the content item, title or creation information of the content item, a reference to the content item, or a combination thereof.

Template identifier 422 is configured to identify one or more templates to apply to the identified content item (e.g., identified by content identifier 421) to determine features of the content item, or other information about the content item. Templates may include simplified features, references for identifying objects, references for comparing a post to another post (e.g., or content items thereof), any other suitable predetermined references, or any combination thereof. For example, templates may be configured for identifying objects, entities (e.g., people, faces, places, buildings, landmarks), compositions (e.g., color-scale, resolution, arrangement, visual features), any other suitable features, or any combination thereof.

User profile analyzer 423 is configured to retrieve, analyze, select, or a combination thereof information from user profile information 440 that may be used to generate timeline 450. For example, timeline generator 420 may retrieve or otherwise access content and metadata to populate timeline 450 with content, advertisements, user history, user interactive tools, user information, user preferences, any other suitable content or information, or any combination thereof.

Display generator 424 is configured to determine how, where, and when to display the generated posts 451 and 455 of timeline 450. To illustrate in the context of an image, display generator 424 presents the image or a representation thereof to the user formatted for arrangement in a timeline. Display generator 424 may be implemented on hardware such as a video card, a video display controller, a graphics processor, input and output connectors and terminals, a graphics application, a video driver, any other suitable hardware or software, or any combination thereof. In some embodiments, display generator 424 may be, but need not be, implemented on different control circuitry from the rest of system 400.

Metadata manager 425 retrieves metadata from optimized database 430, adds tags to metadata of optimized database 430, generates metadata of optimized database 430, or otherwise manages updating and storing of metadata corresponding to a content item identified by content identifier 421. Metadata manager 425 may be, but need not be, different from metadata manager 325 or metadata manager 353 of FIG. 3. In some embodiments, metadata manager 425 reads and writes files to memory (e.g., local memory storage or remote storage via a communications network). For example, in some embodiments, metadata manager 425 opens a content data file and metadata and provides that information to content identifier 421, template identifier 422, user profile analyzer 423, display generator 424, or a combination thereof. In a further example, any or all of content identifier 421, template identifier 422, and user profile analyzer 423 may generate tags or other changes to metadata, which may be provided to metadata manager 425, which in turn writes this information to an appropriate file and saves the file in suitable storage.

Figure 5:
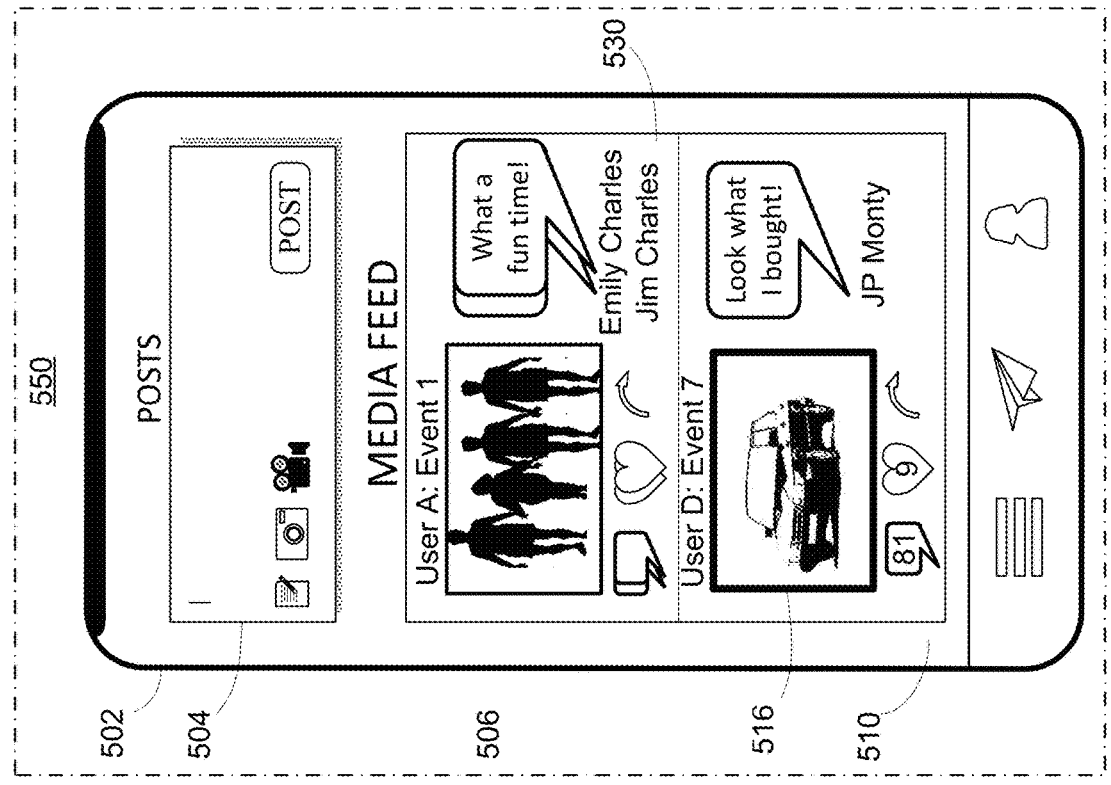
FIG. 5 shows a face view of an illustrative device displays for displaying a media feed, in accordance with some embodiments of the present disclosure.
Figure 5:
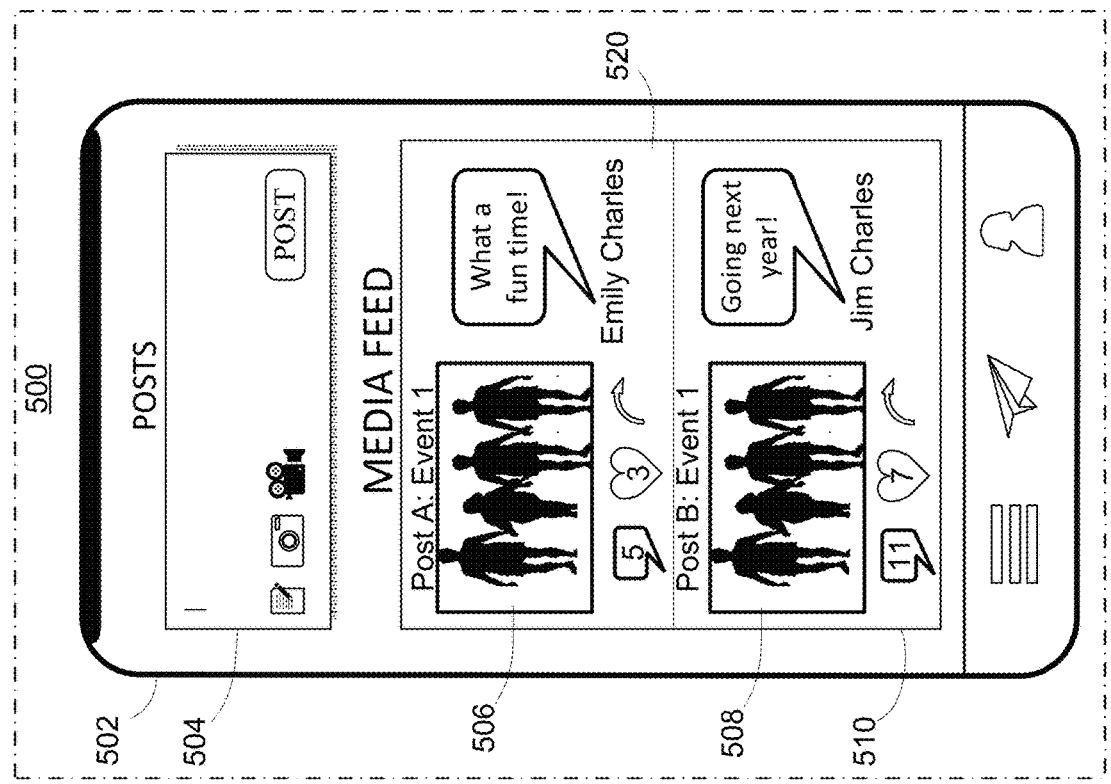

FIG. 5 shows a face view of illustrative device displays 500 and 550 for displaying a media feed, in accordance with some embodiments of the present disclosure. Device display 500, which may include a touchscreen of a smart phone, illustrates a timeline having two posts 510 and 520 shown (e.g., more posts may be available by scrolling or otherwise navigating). Post 520 includes image 506 and post 510 includes image 508, which are very similar in appearance. Each of posts 510 and 520 have associated comments, likes and tools illustrated. Because posts 510 and 520 are relatively similar, the system may determine whether posts 510 and 520 are duplicative. Device display 550 illustrates a timeline similar to that of device display 500, but with posts 510 and 520 combined into post 530, thus allowing post 516 to be displayed (e.g., duplicative content is condensed to allow other content to be displayed). In some embodiments, any or all of systems 200, 300, and 400 of FIGS. 2-4 may be implemented to achieve device display 550 having a combined post.

Figure 6:
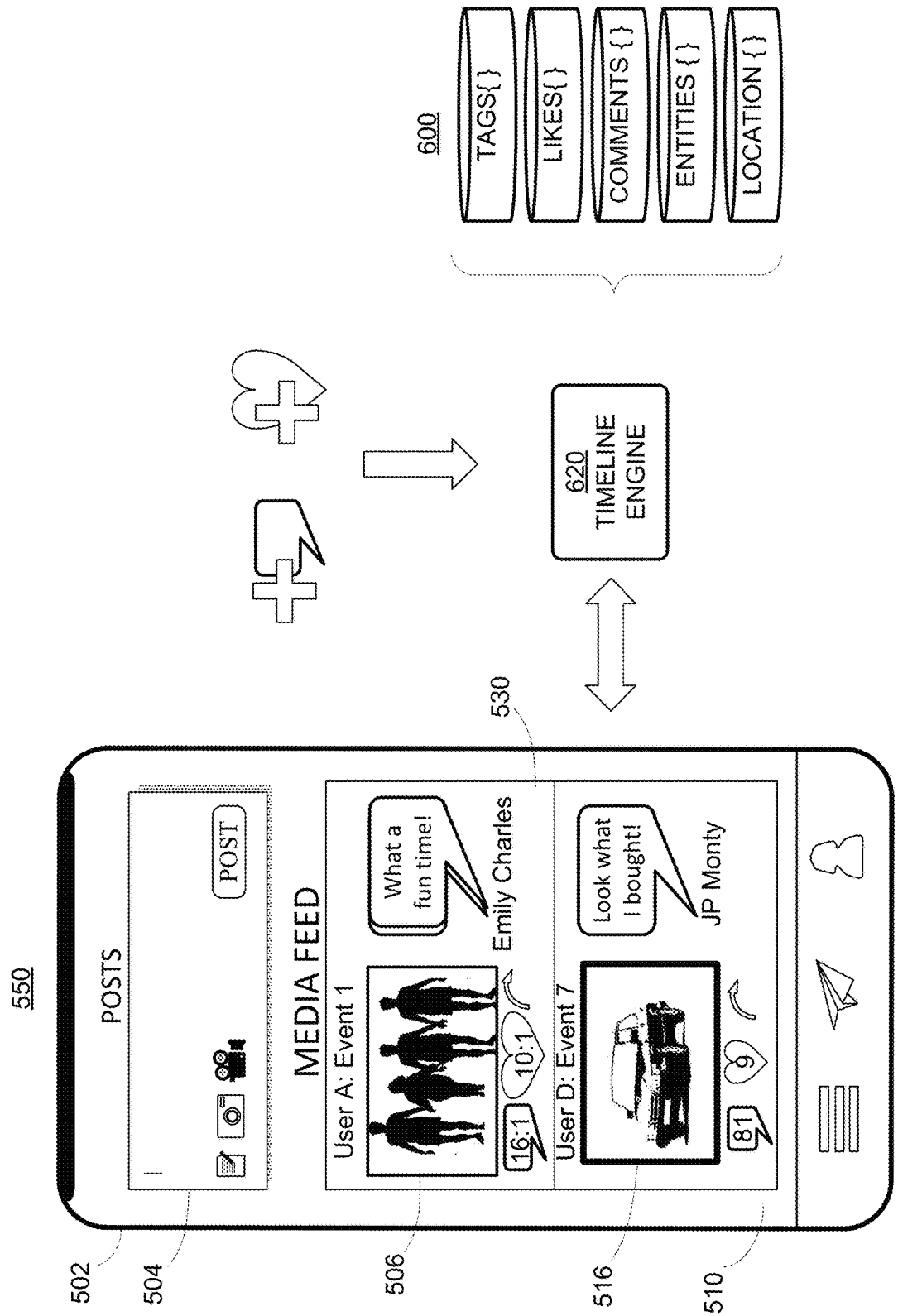
FIG. 6 shows a face view of an illustrative device display displaying a composite item in a media feed, in accordance with some embodiments of the present disclosure.

FIG. 6 shows a face view of illustrative device display 550 of FIG. 5, displaying a composite item in a media feed, in accordance with some embodiments of the present disclosure. While post 530 is included in the timeline, interactions may be initiated with post 530. For example, a user may like, comment on, share, or otherwise interact with post 506. In some such circumstances, timeline engine 620 must determine how to implement the interactions in view of post 530 including two previously individual posts 510 and 520 that have differing creators, posters, statistics, comments, or other indicators. For example, if a user inputs a like associated with post 530, the like may be distributed to the entity associated with post 510, the entity associated with post 520, or both entities. Timeline engine 620 may retrieve or otherwise access metadata 600 to determine how to manage interactions with combined post 530. Metadata 600 may include tags, like information, comment information, entity information, location information, any other suitable information, or any combination thereof.

Figure 7:
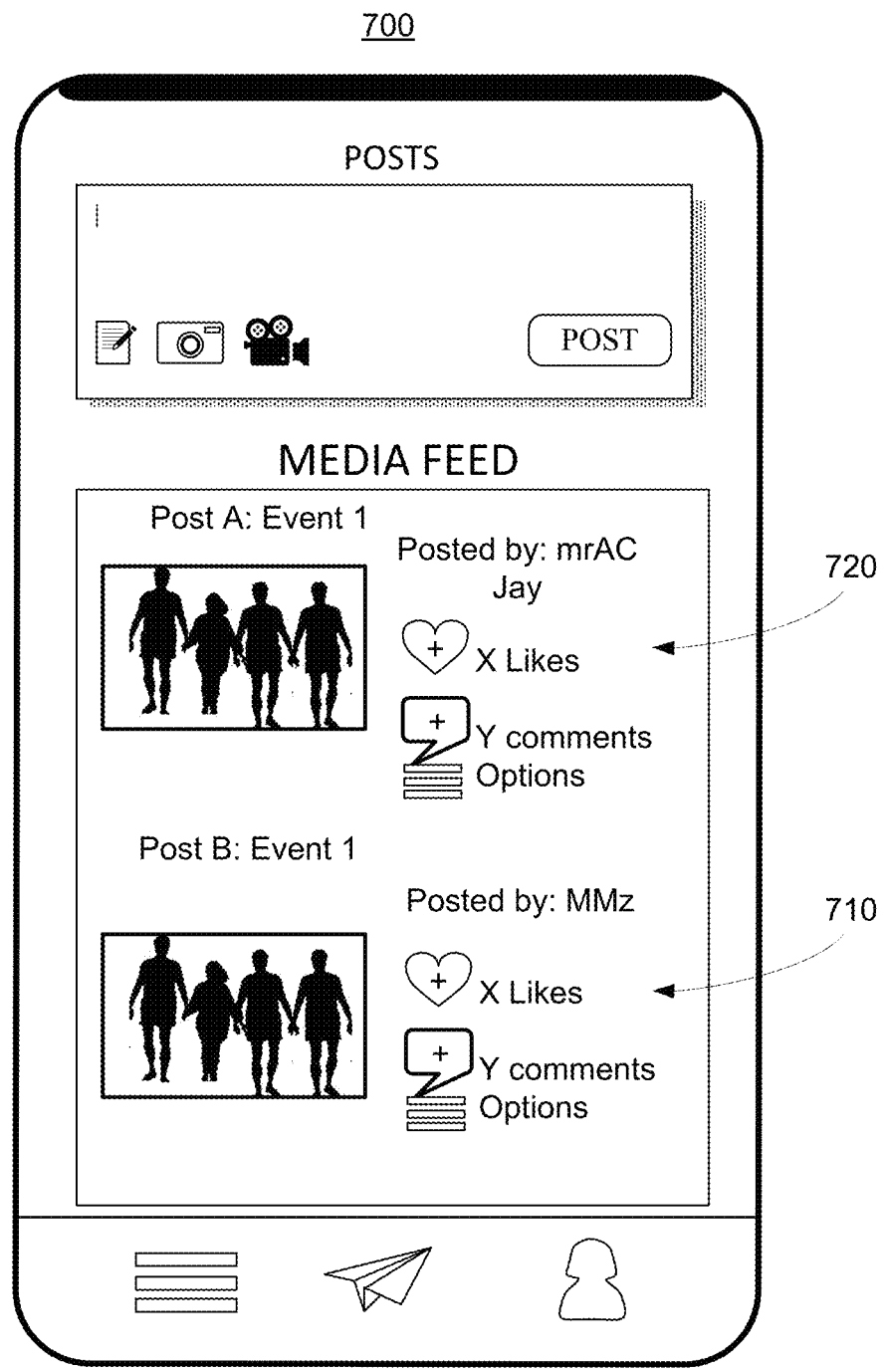
FIG. 7 shows a face view of an illustrative device display displaying an expanded composite post in a media feed, in accordance with some embodiments of the present disclosure.

FIG. 7 shows a face view of illustrative device display 700 displaying an expanded composite post in a media feed, in accordance with some embodiments of the present disclosure. In the context of device display 550 of FIGS. 5-6, timeline generator 620 may provide the expanded composite post to allow the user to manage how likes, comments, and other interactions affect the underlying posts. For example, the user may want the like or comment applied to content of a particular post rather than the other post that makes up the combined post. Accordingly, timeline generator 620 may provide tools, criteria, or options to allow interactions to be targeted to content creators, posters of content, uploaders of content, entities associated with content, or a combination thereof. Tools 710 and 720, for example, allow interaction with the underlying posts. For example, because a user might not be aware that a post is actually a combined post, tools 710 and 720 provide an indication to the user what information has been combined and provide a more complete view of the combined post, and information associated with the post.

Figure 8:
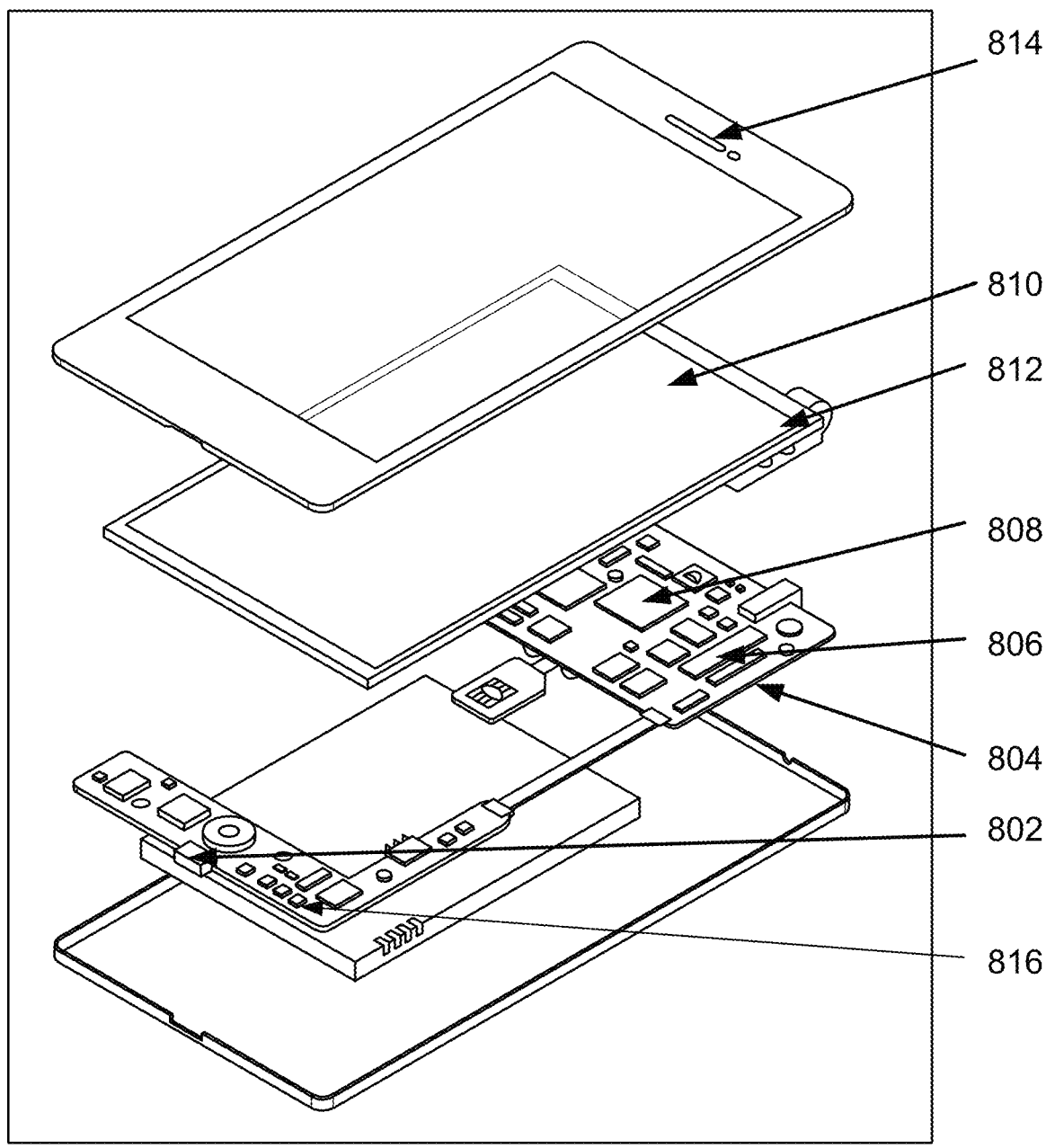
FIG. 8 is a block diagram of an illustrative user device, in accordance with some embodiments of the present disclosure.

A user may access content, an application, and other features from one or more of their devices (i.e., user equipment). FIG. 8 shows generalized embodiments of an illustrative user device. Although illustrated as a mobile user device (e.g., a smartphone), user device 800 may include any user electronic device with which a user may access a media feed (e.g., a timeline). For example, user device 800 may include a desktop computer, a tablet, a laptop, a remote server, any other suitable device, or any combination thereof. In some embodiments, display 812 may include a touchscreen, a television display or a computer display. In some embodiments, the one or more circuit boards illustrated include processing circuitry, control circuitry, and storage (e.g., RAM, ROM, Hard Disk, Removable Disk, etc.). In some embodiments, circuit boards include an input/output path. User device 800 may receive content and data via input/output (hereinafter "I/O") path 802. I/O path 802 may provide content and data to control circuitry 804, which includes processing circuitry 806 and storage 808. Control circuitry 804 may be used to send and receive commands, requests, and other suitable data using I/O path 802. I/O path 802 may connect control circuitry 804 (and specifically processing circuitry 806) to one or more communications paths (described below). I/O functions may be provided by one or more of these communications paths but are shown as a single path in FIG. 8 to avoid overcomplicating the drawing.

Control circuitry 804 may be based on any suitable processing circuitry such as processing circuitry 806. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry is distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 804 executes instructions for an application stored in memory (e.g., storage 808). Specifically, control circuitry 804 may be instructed by the application to perform the functions discussed above and below. For example, the application may provide instructions to control circuitry 804 to generate media guidance displays. In some implementations, any action performed by control circuitry 804 may be based on instructions received from the application.

In some client-server-based embodiments, control circuitry 804 includes communications circuitry suitable for communicating with an application server or other networks or servers. The instructions for carrying out the above-mentioned functionality may be stored on the application server. Communications circuitry may include a cable modem, an integrated-services digital network (ISDN) modem, a digital subscriber line (DSL) modem, a telephone modem, an ethernet card, or a wireless modem for communications with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other (described in more detail below).

Memory may be an electronic storage device provided as storage 808 that is part of control circuitry 804. As referred to herein, the phrase "electronic storage device" or "storage device" should be understood to mean any device for storing electronic data, computer software, or firmware, such as random-access memory, read-only memory, hard drives, optical drives, solid state devices, quantum storage devices, gaming consoles, gaming media, or any other suitable fixed or removable storage devices, and/or any combination of the same. Storage 808 may be used to store various types of content described herein as well as media guidance data described above. Nonvolatile memory may also be used (e.g., to launch a boot-up routine and other instructions). Cloud-based storage, for example, may be used to supplement storage 808 or instead of storage 808.

A user may send instructions to control circuitry 804 using user input interface 810. User input interface 810, display 812, or both may include a touchscreen configured to provide a display and receive haptic input. For example, the touchscreen may be configured to receive haptic input from a finger, a stylus, or both. In some embodiments, equipment device 800 may include a front-facing screen and a rear-facing screen, multiple front screens, or multiple angled screens. In some embodiments, user input interface 810 includes a remote-control device having one or more microphones, buttons, keypads, any other components configured to receive user input or combinations thereof. For example, user input interface 810 may include a handheld remote-control device having an alphanumeric keypad and option buttons.

Audio equipment 814 may be provided as integrated with other elements of user device 800 or may be stand-alone units. The audio component of videos and other content displayed on display 812 may be played through speakers of audio equipment 814. In some embodiments, the audio may be distributed to a receiver (not shown), which processes and outputs the audio via speakers of audio equipment 814. In some embodiments, for example, control circuitry 804 is configured to provide audio cues to a user, or other audio feedback to a user, using speakers of audio equipment 814. Audio equipment 814 may include a microphone configured to receive audio input such as voice commands or speech. For example, a user may speak letters or words that are received by the microphone and converted to text by control circuitry 804. In a further example, a user may voice commands that are received by the microphone and recognized by control circuitry 804.

An application (e.g., for generating a timeline, a display, or both) may be implemented using any suitable architecture. For example, a stand-alone application may be wholly implemented on user device 800. In some such embodiments, instructions for the application are stored locally (e.g., in storage 808), and data for use by the application is downloaded on a periodic basis (e.g., from an out-of-band feed, from an Internet resource, or using another suitable approach). Control circuitry 804 may retrieve instructions of the application from storage 808 and process the instructions to generate any of the displays discussed herein. Based on the processed instructions, control circuitry 804 may determine what action to perform when input is received from input interface 810. For example, movement of a cursor on a display up/down may be indicated by the processed instructions when input interface 810 indicates that an up/down button was selected. An application and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or it may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

In some embodiments, the application is a client-server-based application. Data for use by a thick or thin client implemented on user device 800 is retrieved on demand by issuing requests to a server remote from user device 800. For example, the remote server may store the instructions for the application in a storage device. The remote server may process the stored instructions using circuitry (e.g., control circuitry 804) and generate the displays discussed above and below. The client device may receive the displays generated by the remote server and may display the content of the displays locally on user device 800. This way, the processing of the instructions is performed remotely by the server while the resulting displays (e.g., that may include text, a keyboard, or other visuals) are provided locally on user device 800. User device 800 may receive inputs from the user via input interface 810 and transmit those inputs to the remote server for processing and generating the corresponding displays. For example, user device 800 may transmit a communication to the remote server indicating that an up/down button was selected via input interface 810. The remote server may process instructions in accordance with that input and generate a display of the application corresponding to the input (e.g., a display that moves a cursor up/down). The generated display is then transmitted to user device 800 for presentation to the user.

In some embodiments, the application is downloaded and interpreted or otherwise run by an interpreter or virtual machine (e.g., run by control circuitry 804). In some embodiments, the application may be encoded in the ETV Binary Interchange Format (EBIF), received by control circuitry 804 as part of a suitable feed, and interpreted by a user agent running on control circuitry 804. For example, the application may be an EBIF application. In some embodiments, the application may be defined by a series of JAVA-based files that are received and run by a local virtual machine or other suitable middleware executed by control circuitry 804.

Figure 9:
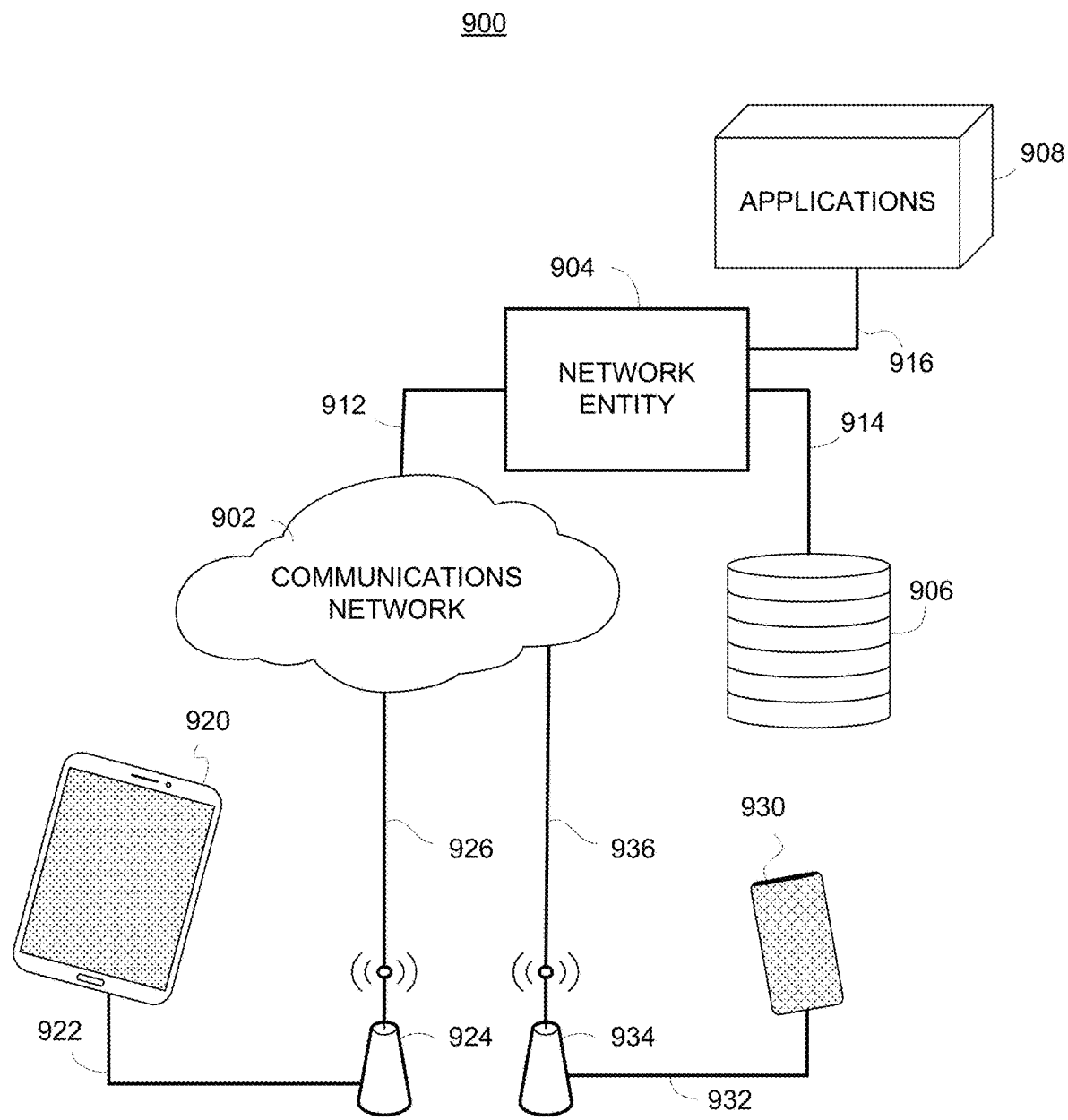
FIG. 9 is a block diagram of an illustrative system for transmitting information, in accordance with some embodiments of the present disclosure.

FIG. 9 is a block diagram of illustrative system 900 for transmitting messages, in accordance with some embodiments of the present disclosure. In system 900, there may be more than one of each type of user device, but only one of each is shown in FIG. 9 to avoid overcomplicating the drawing. In addition, each user may utilize more than one type of user device and also more than one of each type of user device. In some embodiments, a user device (e.g., user device 930, user computer equipment 920) may be referred to as a "second screen device." For example, a second screen device may supplement content, software applications, or other functionality presented on a first user device. As illustrated, a first user may use user device 920 and a second user may use user device 930 (e.g., a sender and a recipient of a media post).

User devices 920 and 930, illustrated as wireless-enabled devices, may be coupled to communications network 902 (e.g., the Internet). For example, user device 920 is coupled to communications network 902 via communications path 922 to access point 924 and wired connection 926, and user device 930 is coupled to communications network 902 via communications path 932 to access point 934 and wired connection 936. User devices 920 and 930 may also include wired connections to a LAN, or any other suitable communications link to network 902. Communications network 902 may be one or more networks including the Internet, a mobile phone network, mobile voice or data network (e.g., a 4G or LTE network), cable network, public switched telephone network, or other types of communications network or combinations of communications networks. Paths 912, 926, and 936 may separately or together include one or more communications paths, such as a satellite path, a fiber-optic path, a cable path, a path that supports Internet communications, a free-space connection (e.g., for broadcast or other wireless signals), or any other suitable wired or wireless communications path or combination of such paths. Although communications paths are not drawn between user devices 920 and 930, these devices may communicate directly with each other via communications paths, such as those described above in connection with paths 926 and 936, as well as other short-range point-to-point communications paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 902.

System 900 includes network entity 904 (e.g., a server or other suitable computing device) coupled to communications network 902 via communications path 912. Path 912 may include any communications path described above in connection with paths 926 and 936. Communications with network entity 904 may be exchanged over one or more communications paths but are shown as a single path in FIG. 9 to avoid overcomplicating the drawing. Network entity 904 is configured to access database 906 or applications 908 (e.g., an applications database or host server) via communications links 914 and 916, respectively. Although shown as a separate device, network entity 904 may include database 906 and applications 908 (e.g., stored in memory). In addition, there may be more than one of each of database 906 and applications 908, but only one of each is shown in FIG. 9 to avoid overcomplicating the drawing. In some embodiments, database 906 and applications 908 may be integrated as one source device (e.g., that may be, but need not be, network entity 904). Although communications between database 906 and applications 908 with user devices 920 and 930 are shown as through communications network 902, in some embodiments, database 906 and applications 908 may communicate directly with user devices 920 and 930 via communications paths (not shown) such as those described above.

Database 906 may include one or more types of stored information, including, for example, relationship information, a relationship entity database, recipient information, historical communications records, user preferences, user profile information, a template database, any other suitable information, or any combination thereof. Applications 908 may include an applications-hosting database or server, plug-ins, a software developers kit (SDK), an applications programming interface (API), or other software tools configured to provide software (e.g., as download to a user device), run software remotely (e.g., hosting applications accessed by user devices), or otherwise provide applications support to applications of user devices 920 and 930. In some embodiments, information from network entity 904, database 906, applications 908, or a combination thereof may be provided to a user device using a client-server approach. For example, user device 920 or user device 930 may pull information from a server, or a server may push information to user device 920 or user device 930. In some embodiments, an application client residing on user device 920 or user device 930 may initiate sessions with database 906, applications 908, network entity 904, or a combination thereof to obtain information when needed (e.g., when data is out-of-date or when a user device receives a request from the user to receive data). In some embodiments, information may include user information. For example, the user information may include current and/or historical user activity information (e.g., what communications the user engages in, what times of day the user sends/receives messages, whether the user interacts with a social network, at what times the user interacts with a social network to post information, what types of content the user typically inserts in messages, stored contacts of the user, frequent contacts of the user, any other suitable information, or any combination thereof. In some embodiments, the user information may identify patterns of a given user for a period of more than one year.

In some embodiments, an application may include a timeline generator as a stand-alone application implemented on user devices 920 and 930. For example, the application may be implemented as software or a set of executable instructions, which may be stored in storage (e.g., storage 808) of the user devices (e.g., user device 800), and executed by control circuitry (e.g., control circuitry 804) of the user devices (e.g., user device 800). In some embodiments, an application may include a timeline generator application that is implemented as a client-server-based application where only a client application resides on the user device, and a server application resides on a remote server (e.g., network entity 904). For example, timeline generator applications may be implemented partially as a client application on user device 920 or user device 930 (e.g., by control circuitry 804 of user equipment device 800) and partially on a remote server as a server application running on control circuitry of the remote server (e.g., control circuitry of network entity 904). When executed by control circuitry of the remote server, the timeline generator application may instruct the control circuitry to generate the displays and transmit the generated displays to user devices 920 and 930. The server application may instruct the control circuitry of the remote device to transmit data for storage on user device 920 or user device 930. The client application may instruct control circuitry of the receiving user device to generate the application displays.

In some embodiments, the arrangement of system 900 is a cloud-based arrangement. The cloud provides access to services, such as information storage, messaging, or social networking services, among other examples, as well as access to any content described above, for user devices. Services can be provided in the cloud through cloud computing service providers, or through other providers of online services. For example, the cloud-based services can include a storage service, a sharing site, a social networking site, or other services via which user-sourced content is distributed for viewing by others on connected devices. These cloud-based services may allow a user device to store information to the cloud and to receive information from the cloud rather than storing information locally and accessing locally stored information. Cloud resources may be accessed by a user device using, for example, a web browser, a messaging application, a desktop application, a mobile application, and/or any combination of the same access applications. The user device may be a cloud client that relies on cloud computing for application delivery, or the user equipment device may have some functionality without access to cloud resources. For example, some applications running on the user device may be cloud applications (e.g., applications delivered as a service over the Internet), while other applications may be stored and run on the user device. In some embodiments, a user device may receive information from multiple cloud resources simultaneously.

Figure 10:
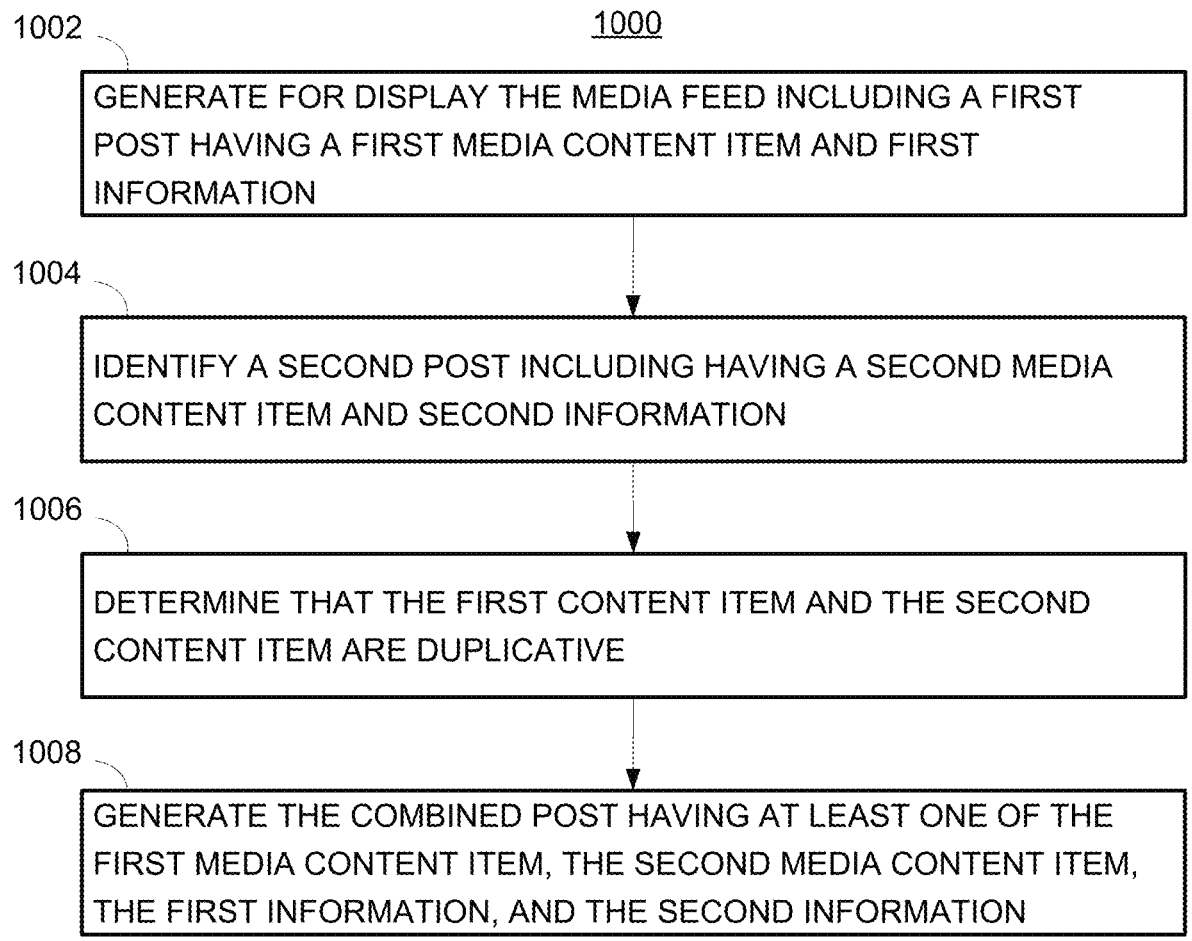
FIG. 10 shows a flowchart of an illustrative process for generating a combined post in a media feed, in accordance with some embodiments of the present disclosure.

FIG. 10 shows a flowchart of illustrative process 1000 for generating personalized messages, in accordance with some embodiments of the present disclosure. For example, an application configured to perform process 1000 may be implemented on any suitable hardware such as user device 500 of FIGS. 5-7, user device 800 of FIG. 8, user device 920 of FIG. 9, user device 930 of FIG. 9, network entity 904 of FIG. 9, any other suitable device, or any combination thereof. In a further example, the application may include the functionality of system 200 of FIG. 2, system 300 of FIG. 3, system 400 of FIG. 4, any other suitable functionality, or a combination thereof.

At step 1002, the application generates the media feed having a first post that includes a first content item and first information. In some embodiments, the application includes a user interface that includes a timeline, a media feed, user-selectable soft buttons, text information, interactive objects, any other suitable visual components, or any combination thereof.

At step 1004, the application identifies a second post that includes a second content item and second information. In an illustrative example, the media feed might already include the second post (e.g., the second post is already visible). In a further example, the second post might not be posted yet, and the application considers the second post before adding to the media feed.

At step 1006, the application determines that the first content item and the second content item are duplicative.

At step 1008, if the first content item and the second content item are duplicative, the application generates a combined post. The combined post includes the first content item, the second content item, the first information, the second information, or a combination thereof. In some embodiments, the application generates the combined post by combining the first information and the second information to form composite information. For example, the application may combine "likes," comments, descriptive information, metadata tags, followers, and other suitable information to generate a single, aggregated collection of information. In some embodiments, the application generates the combined post by generating a modified media feed that comprises the combined post. For example, the application may generate a display on a display device that includes a timeline having posts.

In an illustrative example, the application may receive an indication to add the second post to the media feed. The indication may arise from user input, a transmission from another application or system, or the indication may be generated by the application (e.g., based on a timed schedule, or any other suitable trigger). The application may determine relationship information between the first content item and the second content item in response to receiving the indication to add the second post to the media feed. For example, first metadata may be associated with the first content item, and second metadata may be associated with the second content item, and the application may determine the relationship information based on comparing the first metadata and the second metadata. In some embodiments, determining the relationship information includes retrieving the relationship information from a database based on the first metadata and the second metadata. For example, the first and second metadata may be stored and retrievable from storage. The metadata may include one or more metadata tags that identify an entity, an event, a location, an object, or a combination thereof associated with the content. The application may determine whether the first content item and the second content item share the same source (e.g., creation by the same device, storage with the same filename, stored with the same metadata tags) to determine whether the content items are duplicative. In some embodiments, the application determines whether the first and second content items are duplicative by identifying one or more first objects of the first content item, identifying one or more second objects of the second content item, and comparing the one or more first objects to the one or more second objects. For example, the application may apply facial recognition to identify one or more objects or entities in each of the content items, and then compare the identified objects and/or entities to determine whether there is a match.

Figure 11:
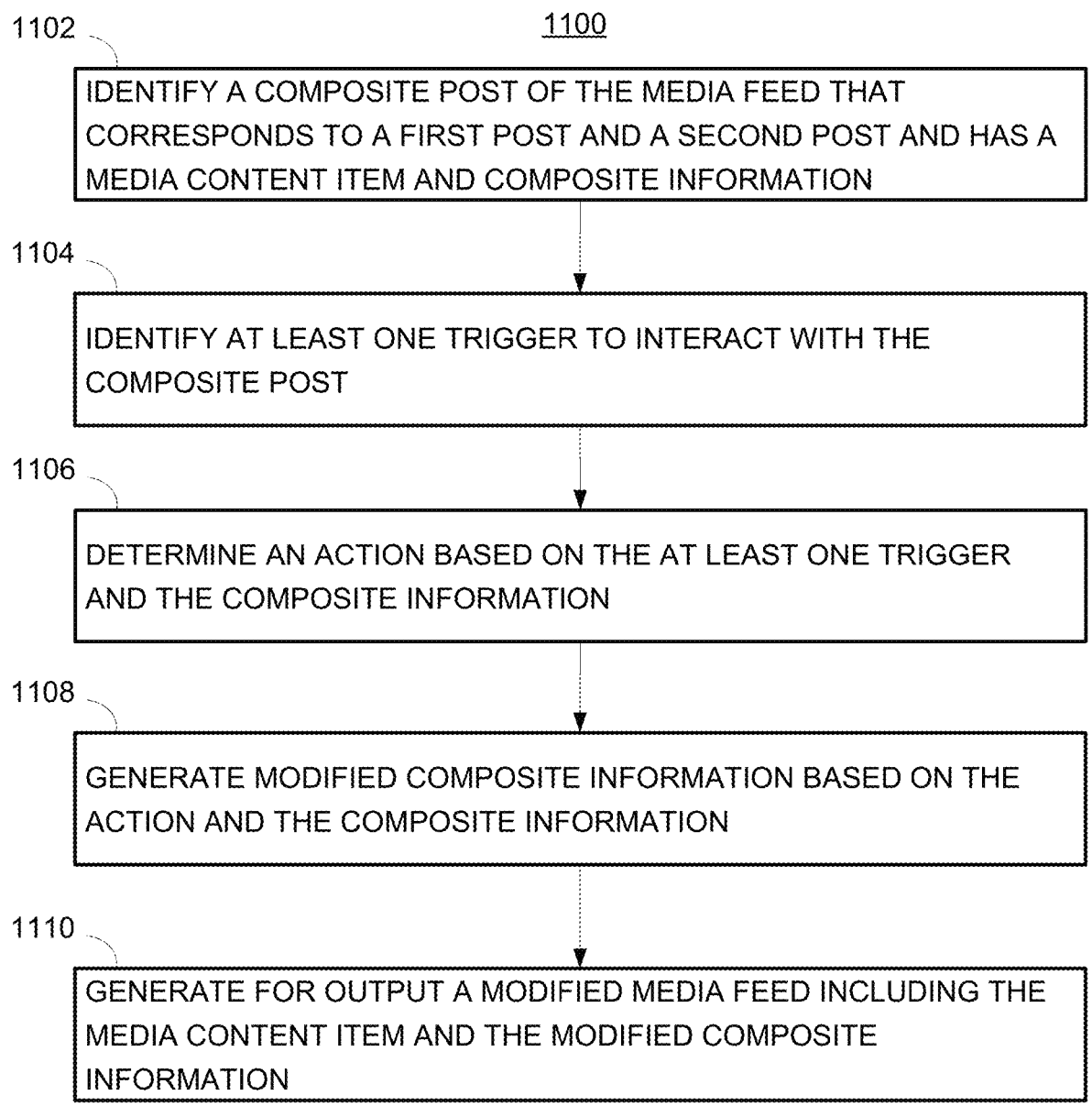
FIG. 11 shows a flowchart of an illustrative process for generating a modified media feed, in accordance with some embodiments of the present disclosure.

FIG. 11 shows a flowchart of illustrative process 1100 for generating a modified media feed, in accordance with some embodiments of the present disclosure. For example, an application configured to perform process 1100 may be implemented on any suitable hardware such as user device 500 of FIGS. 5-7, user device 800 of FIG. 8, user device 920 of FIG. 9, user device 930 of FIG. 9, network entity 904 of FIG. 9, any other suitable device, or any combination thereof. In a further example, the application may include the functionality of system 200 of FIG. 2, system 300 of FIG. 3, system 400 of FIG. 4, any other suitable functionality, or a combination thereof.

At step 1102, the application identifies a composite post of the media feed that corresponds to a first post and a second post. The composite post includes, for example, a content item and composite information. To illustrate, the composite information may include user likes, a number of views, a number of shares, an entity associated with the content item, any other suitable information, or any combination thereof.

At step 1104, the application identifies at least one trigger to interact with the composite post. In some embodiments, the at least one trigger includes an indication to share the composite post. For example, the application may apply composite criteria such as which one or more entities associated with the content item will be considered in response to the trigger, which one or more user selections associated with the content item will be considered in response to the trigger, or both. In some embodiments, the application identifies the two or more entities associated with the combined post in response to identifying the at least one trigger.

At step 1106, the application determines an action based on the at least one trigger and based on one or more composite criteria. In some embodiments, the application retrieves metadata associated with the content item, and the composite criteria are based on the metadata. In some embodiments, for example, the media feed is associated with a user profile, and a first entity is associated with the user profile. In some embodiments, the application accesses user profile information such as historical communications records stored in a database, such as, for example, a stored chat group record, a stored contacts list, a stored text message record, a stored email message record, a stored social media post record, and a stored comments record corresponding to a media content item. In some embodiments, the application determines one or more patterns of interaction from the historical communications records and bases the composite criteria on the patterns. In an illustrative example, the composite criteria may include an identification of the first entity among the two or more entities. In some embodiments, the application may determine composite criteria based on selecting a template from among a plurality of templates for managing interactions. In some embodiments, determining a format of the post and interaction thereof includes determining a type of the post. For example, a type may include a greeting, a holiday wish, a congratulatory statement, an apology, an announcement, a question, a caption (e.g., to accompany an image or video), sharing of content, any other suitable type of post, or any combination thereof. In some embodiments, the application determines the format based on the content of the post.

At step 1108, the application generates modified composite information based on the action and the composite information. In some embodiments, the application modifies the metadata associated with the content item based on the modified composite information. For example, the application may combine metadata tags, generate new tags that are indicative of information being combined, or both. In an illustrative example, the composite information includes information corresponding to each entity of the two or more entities, and the modified composite information includes modified information corresponding to the first or second entity.

At step 1110, the application generates for output a modified media feed that includes the content item and the modified composite information.

In some embodiments, at step 1110, the application determines the modification to apply to the media feed. For example, a caption may be added to a photo or video that indicates which entities are depicted in the photo or video, which entities are indicated in metadata tags associated with the content item, the spatial location or temporal location of the entities in the content item, or a combination thereof. The application generates the modified media feed (e.g., for output on an output device). Output may include, for example, generating a display based on the modified media feed (e.g., displaying the modified media feed on a display device), storing the modified media feed and any suitable metadata in memory storage of one or more suitable devices, transmitting the modified media feed and any suitable metadata across a network or other communications link to one or more other devices (e.g., network devices, user devices, or both), generating any other suitable output, or any combination thereof.

At step 1110, the application determines a modification to apply to the media feed to generate the modified media feed. In some embodiments, the modification includes a visual indicator indicative of the existence of the underlying posts. For example, the modified feed may include one or both posts, one or both content items, stacked information to indicate the composite nature of the post (e.g., collecting and arranging two sets of information), appended information to indicate the composite nature of the post (e.g., generating a combined list from two sets of information), or any combination thereof. In a further example, in some embodiments, the visual indicator includes text indicative of the composite nature of the post (e.g., an icon, a selectable option, a label, multiple icons). In some embodiments, the application may determine not to modify the media feed or otherwise annotate the existing media feed. At step 1110, the application may determine whether to display both content items or one content item, and which content item to display if only one is shown. In some embodiments, the application determines either to modify or not to modify the content item itself by, for example, applying an annotation, overlay, or other indicator. The application also may determine where to display the combined post among other posts of the media feed.

In an illustrative example, two or more entities may be associated with the composite post, the at least one trigger is associated with a first entity of the two or more entities, and the action is associated with the first entity. For example, the application may receive a "like" for a combined post directed at one entity associated with one of the underlying posts, and accordingly, the application may apply the "like" to that entity.

In an illustrative example, the application may identify an entity associated with the content item of a combined post. The control circuitry may apply any suitable technique to identify the entity. The control circuitry may apply object identification, natural language processing, location identification, genre identification, any other suitable technique, or any combination thereof. In some embodiments, identifying the entity associated with the content item includes identifying text associated with the content item, and analyzing the text to identify the entity. For example, the application may identify text or metadata associated with the content item and apply keyword recognition, entity extraction, natural language processing, or any other suitable technique to identify entities represented in, referred to in, or otherwise indicated in the text. In some embodiments, identifying the entity associated with the content item includes identifying one or more objects associated with the content item, and analyzing the one or more objects to identify the entity. For example, the application may identify one or more objects such as images (e.g., graphics, pictures, photographs, or any other suitable format of image), captions (e.g., embedded text, accompanying text, phrases included in metadata), videos (e.g., clips, GIFs, animations), links, identifiers (e.g., network addresses, hardware addresses, email addresses, handles, usernames, alphanumeric codes). In a further example, the application may apply one or more templates to the post or content item to identify an object, wherein the templates may include a set of rules, arrangements, references, or other information for comparing with content to extract objects. In some embodiments, identifying the entity associated with the content item includes identifying a geographic location associated with content item, and identifying the entity based on the geographic location. For example, the application may identify a geographic tag stored in metadata associated with the content item, and compare the geographic tag with tags associated with one or more entities to find a match.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for managing posts on a media feed, the method comprising:
    identifying a composite post of the media feed that corresponds to a first post and a second post, wherein the composite post comprises a content item and composite information, and wherein two or more entities are associated with the composite post;
    identifying at least one trigger to interact with the composite post, wherein the at least one trigger is associated with a first entity of the two or more entities;

determining, using control circuitry, an action based on the at least one trigger and based on one or more composite criteria, wherein the action is associated with the first entity;

generating, using the control circuitry, modified composite information based on the action and the composite information; and generating for output, using the control circuitry, a modified media feed comprising the content item and the modified composite information.

2. The method of claim 1, wherein the at least one trigger comprises an indication to share the composite post, and wherein one or more composite criteria comprise at least one of:

one or more entities associated with the content item; and one or more user selections associated with the content item.

3. The method of claim 1, wherein the composite information comprises at least one of user likes, a number of views, a number of shares, and an entity associated with the content item.

4. The method of claim 1, further comprising retrieving metadata associated with the content item, wherein the composite criteria are based on the metadata.

5. The method of claim 4, further comprising modifying the metadata associated with the content item based on the modified composite information.

6. The method of claim 1, wherein the media feed is associated with a user profile, and wherein the first entity is associated with the user profile.

7. The method of claim 1, wherein the composite information comprises information corresponding to each entity of the two or more entities, and wherein the modified composite information comprises modified information corresponding to the first entity.

8. The method of claim 1, further comprising identifying the two or more entities in response to identifying the at least one trigger.

9. The method of claim 1, wherein the composite criteria comprise an identification of the first entity among the two or more entities.

10. A system for managing posts on a media feed, the system comprising:

control circuitry configured to:

identify a composite post of the media feed that corresponds to a first post and a second post, wherein the composite post comprises a content item and composite information, and wherein two or more entities are associated with the composite post;

identify at least one trigger to interact with the composite post, wherein the at least one trigger is associated with a first entity of the two or more entities;

determine an action based on the at least one trigger and based on one or more composite criteria, wherein the action is associated with the first entity; and generate modified composite information based on the action and the composite information; and an output device coupled to the control circuitry and configured to output a modified media feed comprising the content item and the modified composite information.

11. The system of claim 10, wherein the at least one trigger comprises an indication to share the composite post, and wherein one or more composite criteria comprise at least one of:

one or more entities associated with the content item; and one or more user selections associated with the content item.

12. The system of claim 10, wherein the composite information comprises at least one of user likes, a number of views, a number of shares, and an entity associated with the content item.

13. The system of claim 10, wherein the control circuitry is further configured to retrieve metadata associated with the content item, wherein the composite criteria is based on the metadata.

14. The system of claim 13, wherein the control circuitry is further configured to modify the metadata associated with the content item based on the modified composite information.

15. The system of claim 10, wherein the media feed is associated with a user profile, and wherein the first entity is associated with the user profile.

16. The system of claim 10, wherein the composite information comprises information corresponding to each entity of the two or more entities, and wherein the modified composite information comprises modified information corresponding to the first entity.

17. The system of claim 10, wherein the control circuitry is further configured to identify the two or more entities in response to identifying the at least one trigger.

18. The system of claim 10, wherein the composite criteria comprise an identification of the first entity among the two or more entities.

* * * * *